US009095864B2

(12) United States Patent
Petit

(10) Patent No.: US 9,095,864 B2
(45) Date of Patent: Aug. 4, 2015

(54) DISPENSER UNIT AND A FLUID DISPENSER INCLUDING SUCH A DISPENSER UNIT

(75) Inventor: Ludovic Petit, Vitot (FR)

(73) Assignee: APTAR FRANCE SAS, Le Neubourg (FR)

( * ) Notice: Subject to any disclaimer, the term of this patent is extended or adjusted under 35 U.S.C. 154(b) by 300 days.

(21) Appl. No.: 12/442,052

(22) PCT Filed: Sep. 20, 2007

(86) PCT No.: PCT/FR2007/051974
§ 371 (c)(1),
(2), (4) Date: Mar. 19, 2009

(87) PCT Pub. No.: WO2008/035015
PCT Pub. Date: Mar. 27, 2008

(65) Prior Publication Data

US 2010/0032499 A1 Feb. 11, 2010

(30) Foreign Application Priority Data

Sep. 20, 2006 (FR) ..................................... 06 53830

(51) Int. Cl.
*B65D 88/54* (2006.01)
*G01F 11/00* (2006.01)
(Continued)

(52) U.S. Cl.
CPC ........... *B05B 11/0072* (2013.01); *B05B 1/3436* (2013.01); *B05B 11/3016* (2013.01); *B05B 11/3018* (2013.01)

(58) Field of Classification Search
CPC ............ B05B 11/3016; B05B 11/3018; B05B 11/0072; B05B 1/3436
USPC ................. 222/321.1, 378, 385, 108.09, 190, 222/321.6–321.9, 491–493, 333, 334, 337, 222/461; 239/101, 302, 333–334, 337, 461
See application file for complete search history.

(56) References Cited

U.S. PATENT DOCUMENTS 5,884,819 A 3/1999 Fuchs et al.
6,189,739 B1 2/2001 Von Schuckmann
(Continued)

FOREIGN PATENT DOCUMENTS

DE 196 22 124 A1 12/1997
DE 201 02 271 U1 6/2001
(Continued)

OTHER PUBLICATIONS

International Preliminary Report on Patentability for PCT/FR2007/051974.

*Primary Examiner* — Len Tran
*Assistant Examiner* — Alexander Valvis
(74) *Attorney, Agent, or Firm* — Sughrue Mion, PLLC

(57) ABSTRACT

A fluid dispenser unit comprising: a pump (50) comprising a pump body (52) and at least a first piston (51) that slides in leaktight manner in said pump body (52) between a non-dispensing position and a dispensing position; and a spray head (10) that is mounted on said pump (50) and that is movable manually between a rest position, in which said first piston (51) is in a non-dispensing position, and an actuated position, in which said first piston (51) is moved towards its dispensing position, said spray head (10) including a body (11) that defines an expulsion channel (12) and that is provided with a dispenser orifice (1), said body (11) of the spray head including, upstream from said dispenser orifice (1), a spray profile that is adapted to spray the fluid while it is being dispensed, said spray head (10) including a rigid insert (30) that is disposed upstream from said spray profile and having an end surface that forms the end of said spray profile at least in part; said rigid insert (30) being secured to said first piston (51), said first piston (51) being stationary relative to said spray head (10).

15 Claims, 2 Drawing Sheets

(51) Int. Cl.

| | |
|---|---|
| ***B05B 11/00*** | (2006.01) |
| ***B05B 1/34*** | (2006.01) |

(56) References Cited

U.S. PATENT DOCUMENTS

| | | | | |
|---|---|---|---|---|
| 6,209,760 | B1 * | 4/2001 | Fuchs | 222/321.6 |
| 6,443,370 | B1 * | 9/2002 | Brulle et al. | 239/333 |
| 6,918,514 | B2 * | 7/2005 | Petit | 222/321.9 |
| 6,929,156 | B2 * | 8/2005 | Petit et al. | 222/321.9 |
| 6,938,802 | B2 * | 9/2005 | Petit | 222/321.7 |
| 7,080,759 | B2 * | 7/2006 | Petit | 222/321.2 |
| 7,172,097 | B2 * | 2/2007 | Petit | 222/189.09 |
| 7,954,676 | B2 * | 6/2011 | Petit | 222/321.9 |
| 2004/0026457 | A1 * | 2/2004 | Petit | 222/321.2 |
| 2005/0072861 | A1 | 4/2005 | Petit | |

FOREIGN PATENT DOCUMENTS

| | | | | |
|---|---|---|---|---|
| EP | 0 791 398 | A1 | 8/1997 | |
| FR | 2 645 835 | A1 | 10/1990 | |
| WO | 03/041865 | A1 | 5/2003 | |
| WO | 03/078073 | A1 | 9/2003 | |
| WO | WO 03078073 | A1 * | 9/2003 | B05B 11/00 |
| WO | 03/099706 | A1 | 12/2003 | |

* cited by examiner

DISPENSER UNIT AND A FLUID DISPENSER INCLUDING SUCH A DISPENSER UNIT

The present invention relates to a dispenser unit for a fluid dispenser. The present invention also relates to a fluid dispenser including such a dispenser unit.

The present invention relates more particularly to spray devices, in particular of the nasal type, and preferably applies to sprays incorporating a closure member for closing the dispenser orifice.

In a spray, e.g. of the nasal type, the spray head generally incorporates a spray profile that is provided upstream from the dispenser orifice, and that is adapted to cause the composition to swirl before being expelled in spray form. In known manner, the spray profile can include one or more non-radial channels provided in the end wall of the spray head, said channels leading to a swirl chamber that is disposed immediately upstream from the dispenser orifice.

In general, an insert is disposed in the spray head firstly for substantially filling the dead volume in the expulsion channel, thus leaving only a narrow channel, and secondly for forming the end of the spray profile. An additional part forming the insert is thus necessary for making said spray profile.

The presence of a closure member upstream from the dispenser orifice also poses problems.

Closure members for closing the dispenser orifice of a fluid dispenser are well known in the prior art. There exist several types. A first family of closure members comprises closure members that are urged elastically towards their closed position, and that are deformed or moved by the pressure of the composition during the dispensing stage in order to open the dispenser orifice. Such devices can comprise either closure members made of deformable material, or closure members made in the form of a piston that slides in the expulsion channel away from the dispenser orifice under the effect of the pressure exerted by the composition. Document U.S. Pat. No. 5,806,762 discloses a deformable closure member, surrounding a rigid insert, having a closure function that is directly linked to the pressure exerted by the fluid within the device. Another family of closure members comprises closure members that are deformed mechanically by another portion of the dispenser head when the device is actuated in order to dispense a dose of composition. In this event, the closure member is opened regardless of the pressure exerted by the composition.

Although operating correctly, such closure members present the drawback of being relatively difficult to manufacture and to assemble, and of therefore being costly. In general, the dispenser head needs to be modified in order to match the closure member, thereby also incurring an increase in the cost of manufacturing the fluid dispenser device. In addition, when the dispenser head incorporates a spray profile, the presence of the closure member generally alters the shape of said spray profile, and that is prejudicial to the quality of the spray during expulsion of the composition.

Document WO 03/041865 discloses a spray of the nasal type, in which the insert is slidably mounted in the head so as to form the closure member. A stationary sleeve is fitted so as to define the spray profile. The device in said document WO 03/041865 thus requires four distinct parts to form the head, namely: the body of the head, the piston, the movable insert (closure member), and the sleeve. Assembling together the four parts can also turn out to be quite difficult and therefore costly. Documents FR-2 862 106, FR-2 871 786, FR-2 862 009, WO 03/99706, WO 03/78073, DE 196 22 124, and EP-0 791 398 show other prior-art devices.

Another object of the present invention is to provide a fluid dispenser unit for a fluid dispenser that does not have the above-mentioned drawbacks.

An object of the present invention is to provide a dispenser unit that is simple to manufacture and to assemble, and that does not require the dispenser head to be modified.

Another object of the present invention is to provide a dispenser unit for a fluid dispenser, in which the shape of the spray profile provided upstream from the dispenser orifice is not modified during expulsion of the composition, thereby guaranteeing a spray of good quality.

Another object of the present invention is to provide a fluid dispenser including such a dispenser unit.

The present invention thus provides a fluid dispenser unit comprising: a pump comprising a pump body and at least a first piston that slides in leaktight manner in said pump body between a non-dispensing position and a dispensing position; and a spray head that is mounted on said pump and that is movable manually between a rest position, in which said first piston is in a non-dispensing position, and an actuated position, in which said first piston is moved towards its dispensing position, said spray head including a body that defines an expulsion channel and that is provided with a dispenser orifice, said body of the spray head including, upstream from said dispenser orifice, a spray profile that is adapted to spray the fluid while it is being dispensed, said spray head including a rigid insert that is disposed upstream from said spray profile and having an end surface that forms the end of said spray profile at least in part; said rigid insert being secured to said first piston, said first piston being stationary relative to said spray head.

Advantageously, said rigid insert is made integrally with said first piston.

Advantageously, said first piston includes at least one through passage enabling the fluid to pass from the inside to the outside of said first piston.

Advantageously, said unit may further comprise a closure member that is disposed in said expulsion channel of the spray head upstream from the dispenser orifice, said closure member being movable between a closed position, in which it co-operates with said dispenser orifice in order to close it, and a non-closing position, in which it is moved away from said dispenser orifice, said closure member being urged towards its closed position in the rest position of said spray head.

Advantageously, said closure member is disposed inside said first piston, in particular in slidable manner.

Advantageously, said pump includes a second piston that slides in leaktight manner in said pump body, said second piston co-operating with said closure member in order to move it towards its non-closing position.

Advantageously, said second piston co-operates with said closure member at the end of actuation, when said spray head arrives in its actuated position.

The present invention also provides a fluid dispenser device comprising a reservoir and a dispenser unit as defined above.

Other advantages and characteristics of the invention appear more clearly from the following detailed description, given by way of non-limiting example, and with reference to the accompanying drawings, in which.

Figure 2:
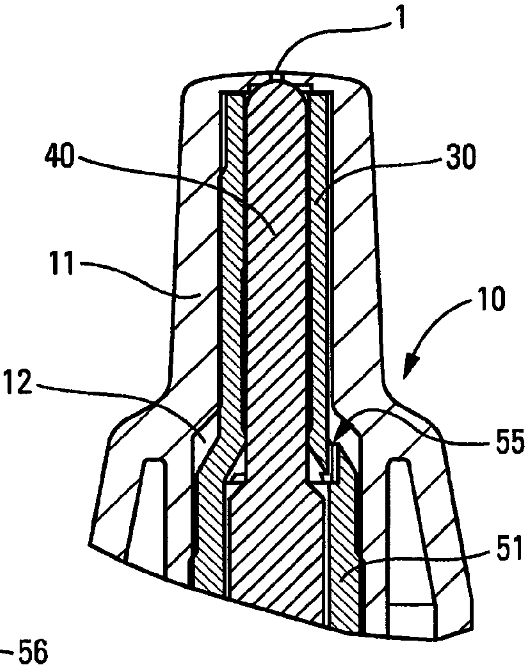
FIG. 2 is a larger-scale detail view of the FIG. 1 spray head, in its rest position.
Figure 3:
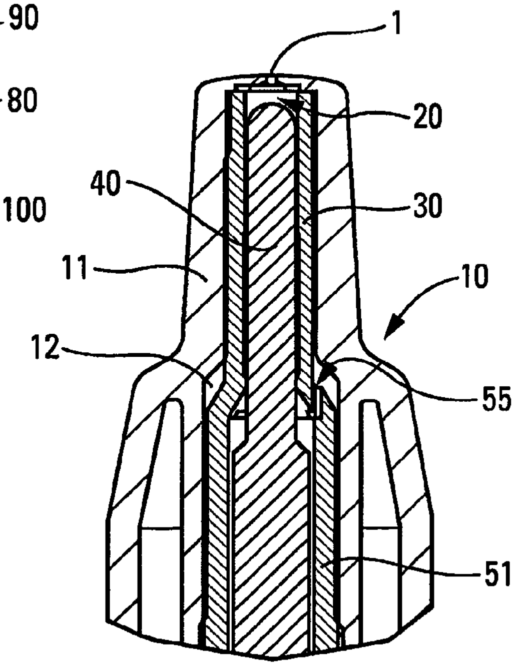
FIG. 3 is a view similar to the view in FIG. 2, in the actuated position.
Figure 5:
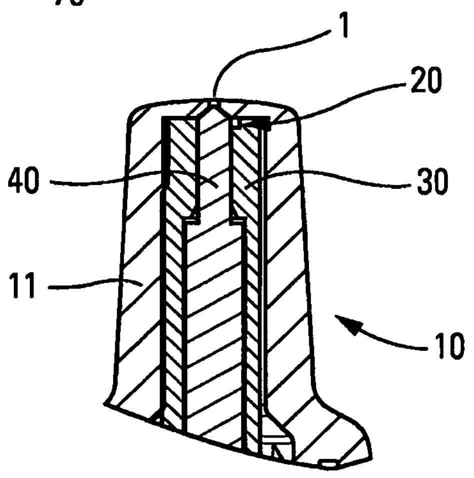
FIG. 5 is a view similar to the view in FIG. 2, showing another variant embodiment of the invention.

The present invention relates more particularly to a dispenser unit provided with a closure member. FIGS. 2, 3, and 5 show the end portion of a nasal dispenser head, but the present invention can equally well be adapted to other types of dispenser head.

Figure 1:
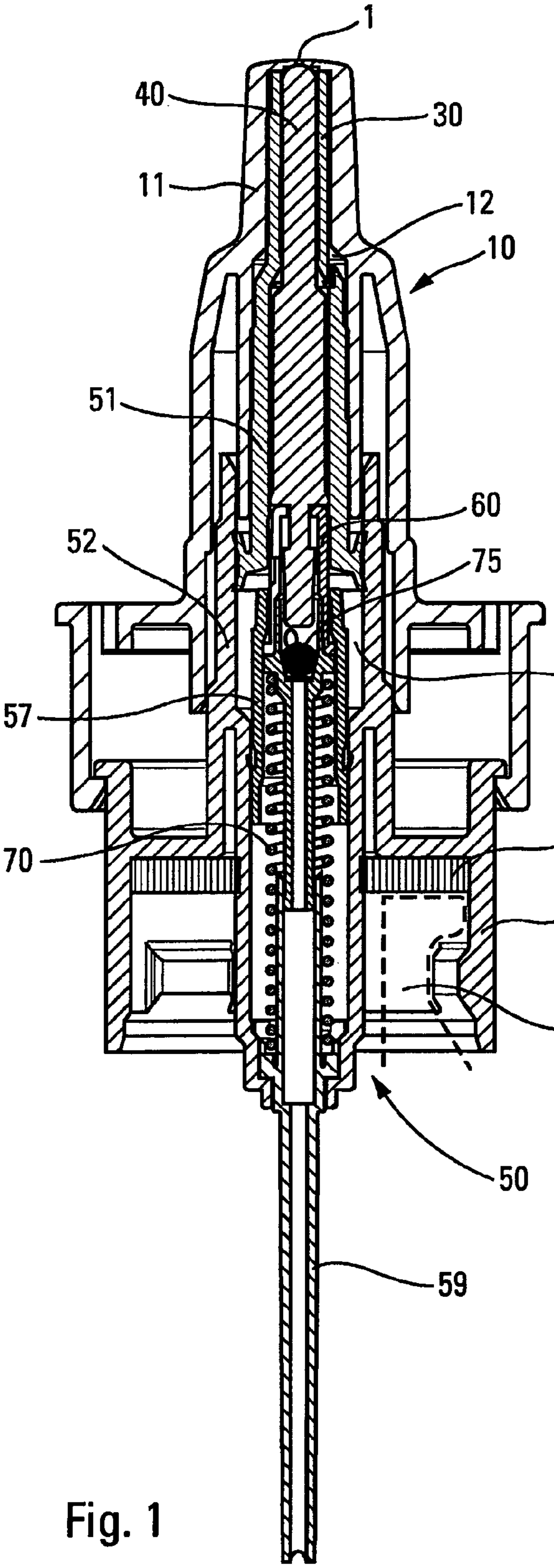
FIG. 1 is a diagrammatic section view of a dispenser unit in an advantageous embodiment of the invention, in its rest position.

The dispenser unit comprises a pump 50 and a spray head 10. The pump 50 can be mounted on a reservoir 100 of which only a fraction is shown by dashes in FIG. 1. It can include a dip tube 59 that extends towards the bottom of the reservoir. Pump mounting can be by means of a fastener ring 80, with a sealing gasket 90 advantageously being interposed. The ring 80 can be a separate part or it can be formed integrally with the pump 50, as shown in FIG. 1. It can be assembled in any way, e.g. by snap-fastening, by screw-fastening, or by crimping.

With reference to the figures, the dispenser head 10 includes a body 11 that defines an expulsion channel 12 that is terminated by a dispenser orifice 1. A rigid insert 30 is disposed in the expulsion channel 12 making it possible to limit the dead volume in the expulsion channel and thus define a narrow passage for the composition, facilitating spraying from the dispenser orifice. The dispenser head includes a spray profile 20, preferably formed between the front face of the end wall of the spray head 10 and said insert 30, the dispenser orifice 1 thus preferably being situated at the center of said spray profile. Preferably, and in known manner, the spray profile can include non-radial swirl channels (not shown) that are connected to a swirl chamber that is disposed directly upstream from the dispenser orifice 1. The spray profile 20 can be formed in the end wall of the head 10, as shown in FIGS. 1 to 4, or, on the contrary, in the insert 30, as shown in FIG. 5.

The pump 50 includes a pump chamber 56 that is provided with an inlet valve 75, such as a ball in the embodiment in FIG. 1.

The pump 50 comprises a pump body 52 in which at least a first piston 51 slides. Advantageously, the pump also comprises a closure member 40 that is disposed upstream from the dispenser orifice 1 and that is adapted to close the orifice when the pump is not in use. The closure member 40 is movable between a closed position, shown in FIGS. 1, 2, 4, and 5, in which it co-operates with the dispenser orifice 1 in order to close it, and a non-closing position, shown in FIG. 3, in which it is moved away from said dispenser orifice 1. En the rest position, the closure member is urged elastically towards its closed position, in particular by means of the return spring 70 of the pump, as shown in the drawings. In a variant, a specific spring could be assigned to said closure member 40.

In the embodiment shown in the figures, the swirl chamber of the spray profile 20 is of volume that is substantially zero in the closed position, the movement of the closure member 40 towards its non-closing position creating a volume that forms the swirl chamber. However, other embodiments can also be envisaged.

Advantageously, the pump shown in FIG. 1 includes a second piston 57 that also slides in leaktight manner in the pump body 52. The second piston 57 is adapted to co-operate with the closure member 40 in order to move it towards its non-closing position, preferably once the pump has been actuated. This provides a certain number of advantages. This configuration enables the closure member 40 to be opened mechanically regardless of the pressure of the composition in the pump during actuation. In addition, this configuration enables the closure member to be opened at the very end of actuation, thereby guaranteeing that the entire dose is dispensed. Naturally, the present invention is not limited to the particular pump embodiment shown in FIG. 1, but, on the contrary, applies to any type of pump.

Figure 4:
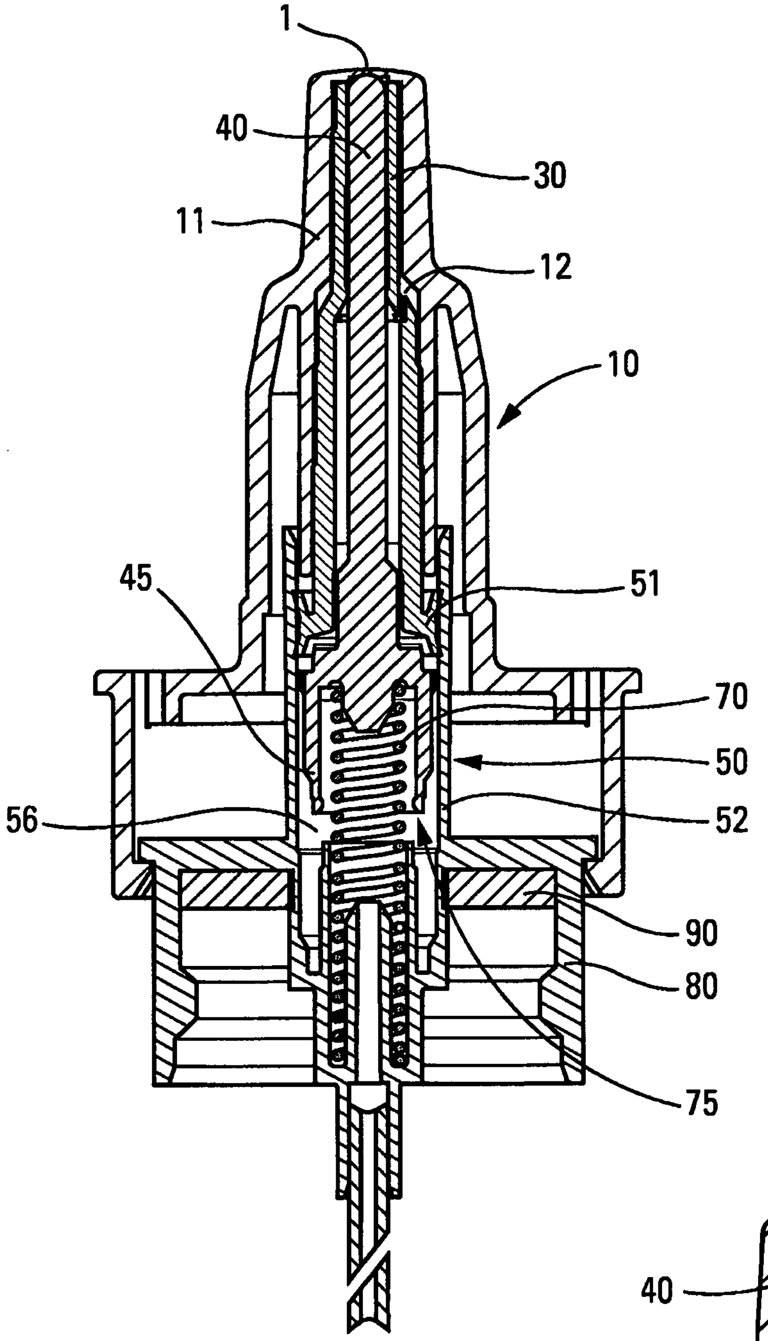
FIG. 4 is a view similar to the view in FIG. 1, showing a variant embodiment of the invention.

FIG. 4 shows another type of pump in which the closure member 40 is extended by a skirt 45 that forms the inlet valve 75 of the pump chamber 56. The invention can also apply to other types of pump.

In the invention, said rigid insert 30 is secured to said first piston 51, and the first piston 51 is stationary relative to the spray head 10. The insert 30 is preferably formed by said first piston 51, i.e. the two parts are made integrally as a single piece. The present invention thus makes it possible to use one part fewer than in known pumps. The first piston 51 preferably includes a through passage 55 that is made in a wall of said first piston 51 and that is adapted to enable the fluid to pass from the inside of said first piston 51 to the outside of said first piston 51. When the first piston 51 forms the insert 30 that is adapted to define the spray profile 20 at the dispenser orifice 1, the composition must flow to the outside of said insert, between the outside surface of said insert 30 and the inside surface of the body 11 of the head 10. Advantageously, said closure member 40 slides inside said first piston 51, as shown in the figures. In this way, the shape of the spray profile 20 remains unchanged, in particular in its non-radial channels (not shown), whatever the position of the closure member 40.

The present invention thus makes it possible, with only three parts, namely the body 11 of the head, the first piston 51, and the closure member 40, to perform the following functions:

Spraying the composition properly while it is being dispensed, as a result of the shape of the spray profile 20 not being modified by the closure member 40 moving towards its non-closing position; the piston 51 forming the insert 30 is advantageously stationary relative to said body 11, such that the shape of the spray profile 20, and in particular of the non-radial channels, remains unchanged during dispensing.

Closing the dispenser orifice completely when the pump is not in use; the closure member 40 can come to co-operate directly with the dispenser orifice 1 by being urged elastically by the return spring of the pump towards its closed position, thereby preventing any germs or bacteria penetrating inside the device between two actuations, and thereby significantly minimizing the risks of contaminating the composition to be dispensed.

Guaranteeing that the entire dose is dispensed on each actuation; the closure member can be opened at the very end of actuation, and can be opened mechanically by the second piston of the pump; this ensures that the pump is pre-compressed completely during actuation thereof, so that when it opens, the entire dose is guaranteed to be dispensed.

The present invention is described above with reference to several advantageous embodiments thereof, but naturally various modifications could be applied thereto without going beyond the ambit of the present invention, as defined by the accompanying claims.

The invention claimed is:

1. A fluid dispenser unit comprising:

a pump comprising a pump body and at least a first piston that slides in leaktight manner in said pump body between a non-dispensing position and a dispensing position; and a spray head mounted on said pump and that is movable manually between a rest position, in which said first piston is in a non-dispensing position, and an actuated position, in which said first piston is moved towards a dispensing position, said spray head including a spray head body, said spray head body is a one-piece integral construction that defines an exterior wall of said spray head and an expulsion channel, said spray head body provided with a dispenser orifice defined in said exterior wall, said spray head body including, upstream from said dispenser orifice, a spray profile that is adapted to spray the fluid while being dispensed, said spray head body having an end wall comprising said dispenser orifice, said spray head including a rigid insert that is disposed inside said spray head body, upstream from said spray profile, said spray profile formed between said end wall of the spray head body and said insert, said insert having an end surface that forms the end of said spray profile at least in part;

said rigid insert is secured to said first piston, said first piston being stationary relative to said spray head body;

said unit further comprises a closure member that is disposed in said expulsion channel of the spray head body directly upstream from the dispenser orifice, said closure member movable between a closed position, in which said closure member co-operates with said dispenser orifice in order to close said dispenser orifice, and a non-closing position, in which said closure member is moved away from said dispenser orifice, said closure member being urged towards the closed position in the rest position of said spray head; and said first piston includes at least one through passage enabling the fluid to pass from an inside to an outside of said first piston, such that said expulsion channel, between said through passage and said spray profile, extends between an outside surface of said rigid insert and an inside surface of said spray head body.

2. The unit according to claim 1, in which said rigid insert is made integrally with said first piston.

3. The unit according to claim 1, in which said closure member is disposed inside said first piston in slidable manner.

4. The unit according to claim 1, in which said pump includes a second piston that slides in leaktight manner in said pump body, said second piston co-operating with said closure member in order to move said closure member towards the non-closing position.

5. The unit according to claim 4, in which said second piston co-operates with said closure member at the end of actuation, when said spray head arrives in the actuated position.

6. The fluid dispenser device, including a reservoir and a dispenser unit according to claim 1, assembled on said reservoir.

7. A fluid dispenser unit comprising:

a pump comprising a pump body and a first piston that slides in leaktight manner in the pump body between a non-dispensing position and a dispensing position;

a spray head mounted on the pump and movable manually between a rest position, in which the first piston is in a non-dispensing position, and an actuated position, in which the first piston is moved towards a dispensing position, the spray head comprising a spray head body, said spray head body is a one-piece integral construction that defines an exterior wall of said spray head, an end wall containing the dispenser orifice and an expulsion channel, the dispenser orifice in the end wall of the spray head body is at a distal end of the spray head body from which fluid passes to directly leave the fluid dispenser unit;

the spray head body comprising, upstream from the dispenser orifice, a spray profile configured to generate a spray of the fluid while the fluid is dispensed;

the spray head comprising a rigid insert disposed inside said spray head body upstream from the spray profile, the spray profile formed between the end wall of the spray head body and the insert, the insert having an end surface that forms the end of the spray profile at least in part;

the rigid insert is secured to the first piston, the first piston configured to remain stationary relative to the spray head body during actuation of the fluid dispenser;

the fluid dispenser further comprising a closure member disposed in the expulsion channel of the spray head body upstream from the dispenser orifice, the closure member configure to move between a closed position, in which the closure member co-operates with the dispenser orifice to close the dispenser orifice, and a non-closing position, in which the closure member is configured to move away from the dispenser orifice; and the closure member is urged towards the closed position in the rest position of the spray head; and the first piston comprises at least one through passage enabling the fluid to pass from an inside to an outside of the first piston, such that said expulsion channel, between said through passage and said spray profile, extends between an outside surface of said rigid insert and an inside surface of said spray head body.

8. The unit according to claim 7, wherein the closure member disposed in the expulsion channel of the spray head body immediately upstream from the dispenser orifice so as to directly contact the dispensing orifice without intervening structure.

9. The unit according to claim 7, wherein the rigid insert is made as a one-piece integral construction with the first piston.

10. The unit according to claim 7, wherein the closure member is disposed inside said first piston in slidable manner.

11. The unit according to claim 7, wherein the pump comprises a second piston that slides in leaktight manner in the pump body, the second piston co-operating with the closure member to move the closure member towards the non-closing position.

12. The unit according to claim 11, wherein the second piston co-operates with the closure member at the end of actuation, when the spray head arrives in the actuated position.

13. A fluid dispenser device, comprising a reservoir, the and a dispenser unit according to claim 7, assembled on the reservoir.

14. The unit according to claim 1, wherein said spray head body is configured to be inserted into and engage a nasal cavity.

15. The unit according to claim 7, wherein the spray head body is configured to be inserted into and engage a nasal cavity.

* * * * *